United States Patent [19]
Glaubitz et al.

[11] Patent Number: 4,917,652
[45] Date of Patent: Apr. 17, 1990

[54] HARVESTER THRESHER WITH MEANS FOR DISTRIBUTING GRAIN-CHAFF MIXTURE

[75] Inventors: Franz Glaubitz; Horst Harig, both of Harsewinkel, Fed. Rep. of Germany

[73] Assignee: Claas Ohg, Harsewinkel, Fed. Rep. of Germany

[21] Appl. No.: 157,736

[22] Filed: Feb. 17, 1988

[30] Foreign Application Priority Data

Feb. 16, 1987 [DE] Fed. Rep. of Germany ....... 3704755

[51] Int. Cl.[4] ............................................. A01F 29/12
[52] U.S. Cl. .................................. 460/111; 239/687; 239/682
[58] Field of Search ............ 56/14.6; 130/27 R, 27 B; 239/681, 682, 687, 688, 689, 655, 654

[56] References Cited

U.S. PATENT DOCUMENTS

| | | | |
|---|---|---|---|
| 1,448,644 | 3/1923 | Wallace | 239/672 |
| 3,329,322 | 7/1967 | Herd | 239/687 |
| 4,591,102 | 5/1986 | Clarke | 239/689 |
| 4,735,216 | 4/1988 | Scott et al. | 56/503 |

FOREIGN PATENT DOCUMENTS

| | | | |
|---|---|---|---|
| 1136303 | 5/1957 | France | 239/655 |
| 1524188 | 9/1978 | United Kingdom | 56/504 |

*Primary Examiner*—John Weiss
*Attorney, Agent, or Firm*—Michael J. Striker

[57] ABSTRACT

A harvester thresher is provided with a device for distributing grain-chaff mixture coming from a grain separating device over the whole width of a cutting mechanism which is generally substantially wider than the harvester thresher itself. For this purpose the housing which surrounds discs provided with distributing strips peripherally and at their one end side is provided with an additional air supply opening, so that in the region of the distributing strips a suction aspirates the grain-chaff mixture into the distributing device.

11 Claims, 3 Drawing Sheets

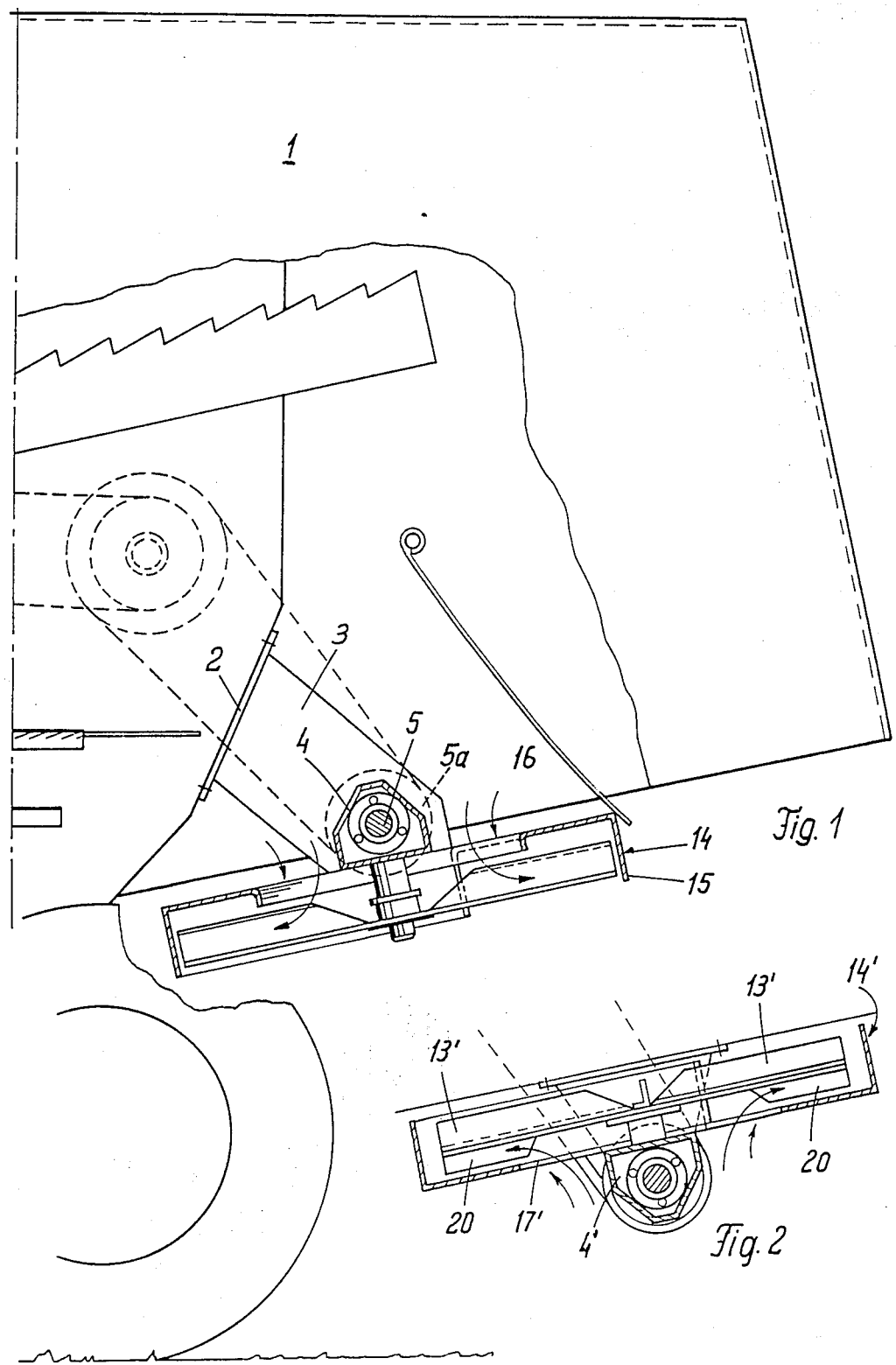

HARVESTER THRESHER WITH MEANS FOR DISTRIBUTING GRAIN-CHAFF MIXTURE

BACKGROUND OF THE INVENTION

The present invention relates to a harvester thresher with a device for distributing a grain-chaff mixture, provided in the region of the discharge end of a grain cleaning device.

More particularly, it relates to a harvester thresher with such a distributing device for a grain-chaff mixture which has two oppositely driveable discs provided with distributing strips and surrounded by a cup-shaped housing which has at least one throwing opening on its periphery.

Distributing device of the above mentioned general type are known in the art, for example from U.S. Pat. No. 4,546,180. They operate in a satisfactory manner as long as they are used for the distribution of relatively heavy product particles. Lighter product particles, however, do not reach the impact region of the distributing strips, since because of the produced air turbulence they simultaneously form a buffer through which the lighter product particles cannot penetrate. Partially because of the centrifuged product stream and partially because of the subsequent stream these light particles are carried over in a completely uncontrolled fashion and finally deposit densely near the machine on the field.

SUMMARY OF THE INVENTION

Accordingly, it is an object of the present invention to provide a harvester thresher of the above mentioned general type, which however, avoids the disadvantages of the prior art.

More particularly, it is an object of the present invention to provide a harvester thresher of the above mentioned general type in which the grain-chaff mixture is uniformly distributed in correspondence with the width of cutting mechanism and the harvester thresher, even when the cutting mechanism is wider than the harvester thresher.

In keeping with these objects and with others which will become apparent hereinafter, one feature of the present invention resides, briefly stated, in that a bottom of a cup-shaped housing which surrounds the discs with the distributing strips is provided with a central air supply opening.

When the harvester thresher is designed in accordance with the present invention, the lighter grain-chaff mixture particles are aspirated in the region of the distributing strips and, being supported by the air stream, are directionally centrifuged outwardly.

In accordance with another feature of the present invention, each disc provided with the distributing strips is surrounded by a separate housing.

Still another feature of the present invention is that a cover provided with a central supply opening faces toward the grain-chaff mixture stream coming from a grain cleaning device, and the distributing strips are arranged between the discs on which they are mounted and the cover.

A further feature of the present invention is that the housing with its open end side faces toward the grain-shaff mixture stream expelled from the grain cleaning device, and the disc at its end which faces toward the grain-chaff mixture stream is provided with the distributing strips and at its side which faces the air supply stream in the cover of the housing is provided with air vanes, and a throughgoing ring gap for air is available between the peripheral cover and the disc.

In accordance with still a further feature of the present invention, each housing is supported turnably about the rotation axis of the disc.

Another feature of the present invention, is that the housing is turnably screwed with a hollow profile which is mounted on the side walls of the harvester.

The hollow profile can accommodate a drive shaft which drives the discs.

Finally, the discs are connected with axles which are rotatably supported in the hollow profile and which carry at one end a spur gear which engages with bevel gears mounted on the drive shaft.

The novel features which are considered as characteristic for the invention are set forth in particular in the appended claims. The invention itself, however, both as to its construction and its method of operation, together with additional objects and advantages thereof, will be best embodiments when read in connection with the accompanying drawings.

BRIEF DESCRIPTION OF THE DRAWINGS

FIG. 1 is a view showing a rear part of a harvester thresher with a distributing device in accordance with the present invention;

FIG. 2 is a view showing a distributing device in accordance with a different embodiment of the invention;

DESCRIPTION OF THE PREFERRED EMBODIMENTS

Figure 4:
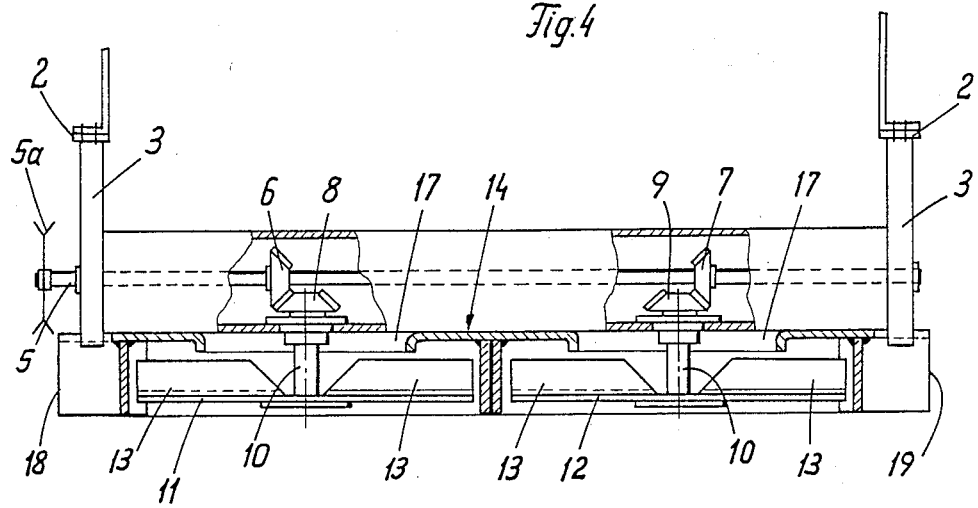
FIG. 4 is a view showing a section of the distributing device, taken along the line IV—IV in FIG. 3.

Reference numeral 1 identifies a rear discharge hood of a harvester thresher. Two flanges 2 are fixedly connected with the discharge hood. Holders 3 which are arranged on the flanges 2 support a hollow profile 4.

A drive shaft 5 is located in the hollow profile 4 and driven via a chain wheel 5a. Two bevel gears 6 and 7 are mounted on the drive shaft 5. Bevel gears 8 and 9 engage with the bevel gears 6 and 7 and are fixedly seated on axles 10. The axles 10 are rotatably supported in the walls of the hollow profile.

Discs 11 and 12 are fixedly connected with the axles 10. The discs 11 and 12 as well as distributing strips 13 are covered by housings 14, respectively. Each housing includes a peripheral cover 15 and an end cover 16.

Figure 3:
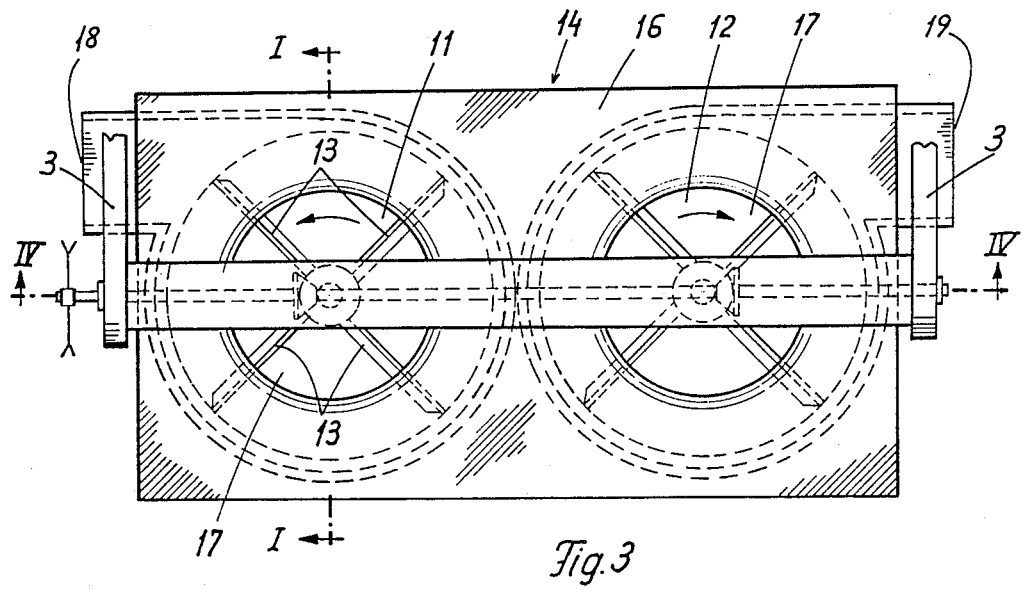
FIG. 3 is a plan view of the inventive distributing device shown in FIG. 1.
Figure 6:
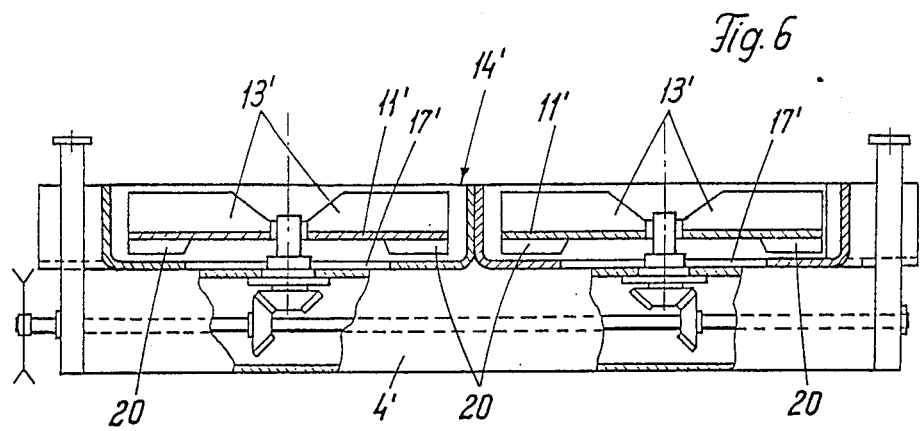
FIG. 6 is a view showing a section of the distributing device taken along the line VI—VI in FIG. 5.
Figure 5:
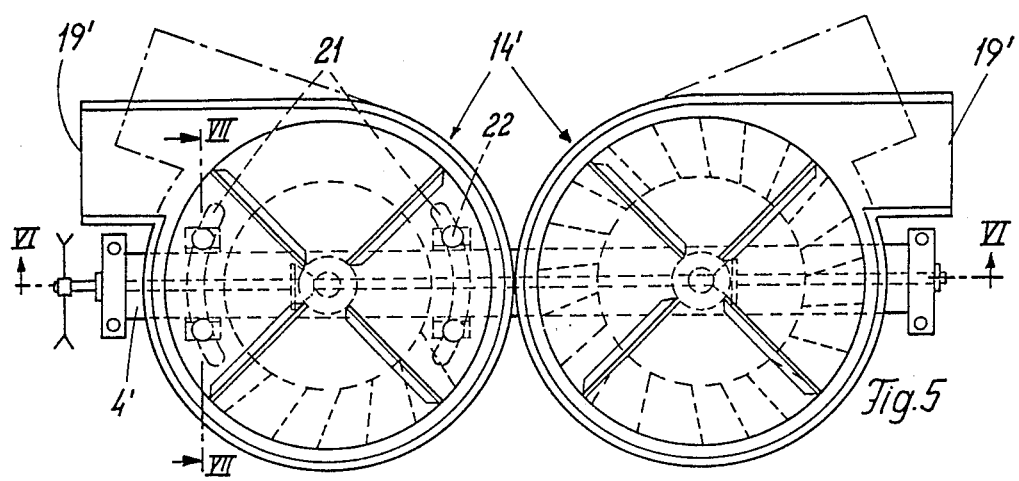
FIG. 5 is a plan view of the inventive distributing device shown in FIG. 2.
Figure 7:
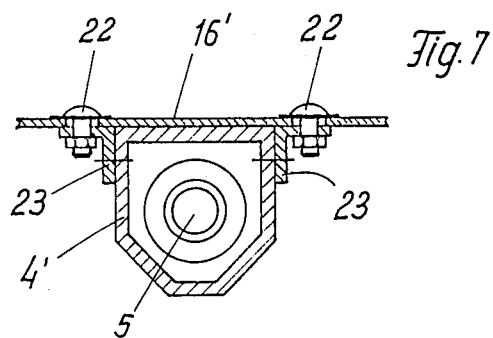
FIG. 7 is a view showing a supporting profile for mounting the distributing device of FIGS. 2, 5, 6.

As can be seem from FIGS. 1 and 4, the end cover 16 of each housing is provided with a throughgoing ring qap 17 for air. In the embodiment shown in FIGS. 1, 3 and 4, air as well as the grain-chaff mixture are aspirated through the throughgoing ring gap 17 with the distributing strips and thrown onto the field through both throwing openings 18 and 19.

FIGS. 2 and 5-7 show another embodiment of the present invention. Only those features of this second embodiment are described hereinbelow which are different from the embodiment of FIGS. 1, 3, 4. As can be seen from FIGS. 2 and 6, discs 11' carry distributing strips 13 on their side which faces toward the oncoming grain-chaff mixture, and also carry additional air vanes 20 on their another side. The throughgoing ring gap 17' for air is therefore associated with the additional air vanes 20, while the distributing strips 13' face toward the open end side of a housing 14'. While in the embodiment of FIGS. 1, 3, 4 the distributing strips 13 simultaneously form the air vanes, in the embodiment of FIGS. 2, 5–7 additional air vanes 20 are provided.

A hollow profile 4' supports the housing 14' and lies at the side of the housing 14 which is opposite to the grain-chaff mixture stream. As can be seen from the left side of FIG. 5 and FIG. 7, an end cover 16' of the housing 14' is provided with elongated openings 21. Screws 22 extends through the elongated openings and screwed with consoles 23 which is mounted on the hollow profile 4' and Thereby there is a possibility to orient the housing 14' and therefore the throwing openings 19' as desired when necessary.

It will be understood that each of the elements described above, or two or more together, may also find a useful application in other types of constructions differing from the types described above.

While the invention has been illustrated and described as embodied in a harvester thresher with means for distributing a grain-chaff mixture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester thresher comprising grain cleaning means having a discharge end; and means for distributing a grain-chaff mixture arranged in the region of said discharge end of said grain cleaning means, said distributing means having two oppositely rotatable discs and a cup-shaped housing which surrounds said discs and has at least one throwing out opening and a bottom, said bottom of said cup-shaped housing having a central air supply opening, each of said discs of said distributing means being provided with a distributing strip attached to said disc, said bottom of said housing is formed as a cover provided with said central air supply opening, said cup-shaped cover also having an open end facing towards said grain cleaning means, said discs having one side facing toward said grain cleaning means and being provided at said one side with said distributing strips, said disc also having another side facing towards said cover of said cup-shaped housing and being provided at said another side with a plurality of air vanes.

2. A harvester thresher as defined in claim 1, wherein said cup-shaped housing has a peripheral region, said at least one throwing out opening being arranged in said peripheral region of said cup-shaped housing.

3. A harvester thresher as defined in claim 1, wherein said housing has two separate cup-shaped housing parts each surrounding a respective one of said discs of said distributing means.

4. A harvester thresher as defined in claim 1, wherein said cup-shaped housing has a peripheral cover forming with said disc a throughgoing annular gap for air.

5. A harvester thresher as defined in claim 1; and further comprising a drive shaft arranged to drive said discs.

6. A harvester thresher as defined in claim 5; and further comprising a hollow profile connecting with said housing and accommodating said drive shaft for driving said discs.

7. A harvester thresher as defined in claim 6; and further comprising means for transmitting rotation of said drive shaft to said discs and including axles connected with said discs and rotatably supported in said hollow profile, spur gears arranged on said axles and bevel gears mounted on said drive shaft and engaging with said spur gears.

8. A harvester thresher comprising grain cleaning means having a discharge end; and means for distributing a grain-chaff mixture arranged in the region of said discharge end of said grain cleaning means, said distributing means having two oppositely rotatable discs and a cup-shaped housing which surrounds said discs and has at least one throwing out opening and a bottom, said bottom of said cup-shaped housing having a central air supply opening, said housing having two separate cup-shaped housing parts each surrounding a respective one of said discs of said distributing means, each of said discs having an axis of rotation, each of said separate housing parts being supported turnably about said axis of rotation of a respective one of said discs.

9. A harvester thresher as defined in claim 8, wherein each of said discs of said distributing means is provided with a distributing strip attached to said disc.

10. A harvester thresher comprising grain cleaning means having a discharge end; means for distributing a grain-chaff mixture arranged in the region of said discharge end of said grain cleaning means, said distributing means having a drive shaft, two oppositely rotatable discs driven from said drive shaft and a cup-shaped housing which surrounds said discs and has at least one throwing out opening and a bottom, said bottom of said cup-shaped housing having a central air supply opening; machine walls; and a hollow profile mounted on said machine walls and surrounding said drive shaft of said distributing means, said housing being turnably connected with said hollow profile.

11. A harvester thresher as defined in claim 10, and further comprising connecting means for turnably connecting said housing with said hollow profile and including screw means.

* * * * *